United States Patent
Xue et al.

(10) Patent No.: US 12,276,639 B1
(45) Date of Patent: Apr. 15, 2025

(54) LARGE-SPACE HIGH-TEMPERATURE AND HIGH-PRESSURE TRUE TRIAXIAL FLEXIBLE LOADING DEVICE

(71) Applicant: Institute of Rock and Soil Mechanics, Chinese Academy of Sciences, Hubei (CN)

(72) Inventors: Qiang Xue, Hubei (CN); Xiaochun Li, Hubei (CN); Hang Ruan, Hubei (CN); Quan Jiang, Hubei (CN); Qingqian Wu, Hubei (CN)

(73) Assignee: Institute of Rock and Soil Mechanics, Chinese Academy of Sciences, Hubei (CN)

( * ) Notice: Subject to any disclaimer, the term of this patent is extended or adjusted under 35 U.S.C. 154(b) by 0 days.

(21) Appl. No.: 18/744,668

(22) Filed: Jun. 16, 2024

(30) Foreign Application Priority Data

Dec. 11, 2023 (CN) .......................... 202311706268.2

(51) Int. Cl.
*G01N 3/10* (2006.01)

(52) U.S. Cl.
CPC ....... *G01N 3/10* (2013.01); *G01N 2203/0048* (2013.01); *G01N 2203/0226* (2013.01); *G01N 2203/0232* (2013.01); *G01N 2203/0256* (2013.01); *G01N 2203/0452* (2013.01)

(58) Field of Classification Search
CPC ............. G01N 3/10; G01N 2203/0048; G01N 2203/0226; G01N 2203/0232; G01N 2203/0256; G01N 2203/0452
See application file for complete search history.

(56) References Cited

U.S. PATENT DOCUMENTS

2016/0356685 A1* 12/2016 Gupta ...................... G01N 3/08
2018/0340417 A1    11/2018 Cooper et al.

FOREIGN PATENT DOCUMENTS

| CN | 102435503 | 5/2012 |
|---|---|---|
| CN | 103234809 | 8/2013 |
| CN | 104132850 | 11/2014 |
| CN | 103398861 | 8/2015 |
| CN | 104614497 | 4/2016 |
| CN | 105628501 | 6/2016 |
| CN | 106680105 | 5/2017 |
| CN | 107505205 | 12/2017 |
| CN | 109443944 | 3/2019 |
| CN | 111426575 | 7/2020 |

* cited by examiner

*Primary Examiner* — Jonathan M Dunlap
(74) *Attorney, Agent, or Firm* — JCIP GLOBAL INC.

(57) ABSTRACT

A large-space high-temperature and high-pressure true triaxial flexible loading device includes a cylinder reaction frame, which includes a cylinder, a lower shear ring, an upper shear ring, a bottom cover, and a top cover, wherein the bottom cover and the top cover are detachably mounted at a bottom and a top inside the cylinder respectively, and an interior of the cylinder is divided to form a loading space for performing a triaxial test on a square test block; the lower shear ring is detachably embedded on an inner wall of the cylinder below the bottom cover; the upper shear ring is detachably embedded on the inner wall of the cylinder above the top cover; a confining pressure reaction frame, mounted in the loading space around the square test block; and, flexible loading mechanisms, disposed in pairs at two opposed side surfaces of the square test block.

7 Claims, 8 Drawing Sheets

LARGE-SPACE HIGH-TEMPERATURE AND HIGH-PRESSURE TRUE TRIAXIAL FLEXIBLE LOADING DEVICE

CROSS-REFERENCE TO RELATED APPLICATION

This application claims the priority benefit of China application serial no. 202311706268.2, filed on Dec. 11, 2023. The entirety of the above-mentioned patent application is hereby incorporated by reference herein and made a part of this specification.

BACKGROUND

Technical Field

The present disclosure relates to the technical field of geotechnical test apparatuses and in particular to a large-space high-temperature and high-pressure true triaxial flexible loading device.

Description of Related Art

The current significant geotechnical engineering constructions are characterized in huge scale, complex structure, unique geological environment and diverse loads, coupled with unprecedented depth, breadth and speed, and the construction environment is presented as complex conditions such as high geostress, high pore water pressure, high ground temperature and strong engineering disturbance and the like (i.e. "three highs and one disturbance"), thereby increasing the engineering difficulty. The large-size true triaxial physical model test can break through the recognition of the traditional indoor test confined to the characteristics of the rock mass mechanics to study the law of the disturbance behaviors of the deep rock masses. At present, the true triaxial physical model test machines in the geotechnical engineering field are mostly single in function and small in loading capability, resulting in failure to reproduce the complex occurrence environment of the deep geotechnical engineering.

In the related arts, the Chinese patent with the publication number CN102435503A proposes a large-size true triaxial test apparatus with a bearing structure being a reaction frame+pressure chamber, which can perform true triaxial loading test on a test sample of 300 mm×300 mm×700 mm, wherein the directions of a large principal stress σ1 and a medium principal stress σ2 are loaded by a jack; the direction of σ2 is loaded by coordination of multiple jacks to increase an output tonnage; the direction of a small principal stress σ3 is applied with a confining pressure by water; and the maximum of the σ2 is 3 Mpa.

In the related arts, the Chinese patent with the publication number CN103398861B proposes a true triaxial rock burst physical simulation test system for a deep tunnel, wherein the bearing structure of the system is a full frame structure using a uniformly-distributed centralized loading technology to provide a large-tonnage uniform load for a test sample by three pairs of jacks.

In the related arts, the Chinese patent with the publication number CN104614497B proposes a true triaxial integrated test system of fluid pressure fracturing, slotting, seepage and gas drive, which disuses the conventional frame structure but places a reduced loading device into a pressure chamber to keep the integrity of a cylinder of the pressure chamber so as to increase its bearing capability for the confining pressure, and thus can provide a axial pressure of up to 31.5 MPa and a confining pressure of up to 20 MPa to a cubic test sample of up to 500 mm×500 mm×500 mm.

In the above related arts, there are the following major technical problems: first, the loading capability is relatively low and a high-geostress environment of the deep geotechnical engineering cannot be simulated; further, the loading modes are mostly rigid loading which specifically includes two approaches: in one approach, distributed small jacks are used and the coordination among the jacks is difficult to guarantee, and the test sample receives non-uniform force which easily generates shear stress on surfaces; in the other approach, a large-section centralized loading approach is used, which solves the problem of the coordinate of the distributed small jacks but cannot solve the problem of the non-uniform load distribution resulting from the failure of the rigid loading device to attach to the test sample due to excess rigidity. Secondly, for the full frame structure, heat can only be transferred between solids, leading to slow heat transfer and large temperature gradient. Finally, the test machine with frame structure+pressure chamber can apply a confining pressure to the test sample, and the pressure chamber needs to have an opening in the direction of the large principal stress σ1 and the medium principal stress σ2 to facilitate telescoping force transfer of the jacks. As a result, the pressure chamber cannot guarantee the structural integrity, significantly weakening the bearing capability of the pressure chamber and generating a sealing problem.

SUMMARY

In order to improve the technical problems in the prior arts, the present disclosure provides a large-space high-temperature and high-pressure true triaxial flexible loading device.

The large-space high-temperature and high-pressure true triaxial flexible loading device in the present disclosure employs the following technical solution.

The large-space high-temperature and high-pressure true triaxial flexible loading device, comprising:
  a cylinder reaction frame, comprising a cylinder, a lower shear ring, an upper shear ring, a bottom cover, and a top cover, wherein the bottom cover and the top cover are detachably mounted at a bottom and a top inside the cylinder respectively, and an interior of the cylinder is divided to form a loading space for performing a triaxial test on a square test block; the lower shear ring is detachably embedded on an inner wall of the cylinder below the bottom cover to form a lower bearing boss for supporting the bottom cover; the upper shear ring is detachably embedded on the inner wall of the cylinder above the top cover to form an upper reaction boss for supporting the top cover;
  a confining pressure reaction frame, mounted in the loading space around the square test block; and,
  flexible loading mechanisms, disposed in pairs at two opposed side surfaces of the square test block to perform triaxial loading on the square test block, wherein a top flexible loading mechanism is disposed between a top of the square test block and the top cover, a bottom flexible loading mechanism is disposed between a bottom of the square test block and the bottom cover, and surrounding flexible loading mechanisms are disposed between surroundings of the square test block and the confining pressure reaction frame, and the confining pressure reaction frame is used for uniformly transfer to an inner sidewall of the cylinder a reaction force generated by the flexible loading mechanisms during loading process.

Furthermore, the confining pressure reaction frame comprises wedge-shaped pre-press modules disposed in pairs beyond two opposed side surfaces of the square test block, each the wedge-shaped pre-press modules comprises a lower wedge-shaped block, an upper wedge-shaped block and an adjusting piece capable of adjusting and locking a relative position of the lower wedge-shaped block and the upper wedge-shaped block, the upper wedge-shaped block and the lower wedge-shaped block are overlapped between a side surface of the square test block and the inner wall of the cylinder, an outer side surface of the lower wedge-shaped block is configured as a curved surface matching the inner wall of the cylinder to disperse a reactive force, an inner side surface of the upper wedge-shaped block is configured as a plane matching the side surface of the square test block, and the upper wedge-shaped block and the lower wedge-shaped block cooperate by wedge-shaped surfaces such that when up and down relative movement between the upper wedge-shaped block and the lower wedge-shaped block occurs, a thickness is adjusted.

Furthermore, one pair of opposed side surfaces on the square test block are space-neighboring surfaces, other pair of opposed side surfaces are non-space-neighboring surfaces, the surrounding flexible loading mechanisms are disposed between the non-space-neighboring surfaces and the wedge-shaped pre-press modules, and a gap is configured between the space-neighboring surfaces and the inner wall of the cylinder to introduce a hydraulic oil into the loading space for loading.

Furthermore, each the flexible loading mechanisms comprises a flat plate type liquid bladder which is formed by welding high-strength thin-walled steel plates, the shape of the flat plate type liquid bladder matches a corresponding side surface of the square test block, and the flat plate type liquid bladder is connected with an oil supply system outside the cylinder through a hydraulic oil pipe.

Furthermore, each side surface of the square test block is fixed with a padding plate by a sealing adhesive.

Furthermore, the upper shear ring and the lower shear ring have a same structure and are each formed into a complete shear ring by splicing multiple curved-surface shear blocks, annular clamping grooves is disposed at a corresponding position of the inner wall of an upper part and a lower part of the cylinder, and each the curved-surface shear block is fixed inside the annular clamping groove by a radial fixing piece.

Furthermore, for each the upper shear ring and the lower shear ring, the curved-surface shear blocks comprise curved-surface trapezoidal shear blocks and curved-surface rectangular shear blocks which are alternately disposed in a spacing and hence the shear ring is spliced by radial movement.

Furthermore, a fixing seat is mounted at a center of the top cover, and multiple traction pieces connected with the curved-surface rectangular shear blocks are mounted on the fixing seat, so as to achieve radial movement of the curved-surface rectangular shear blocks under the action of the traction pieces.

Furthermore, an inner diameter of the upper part of the cylinder is greater than an inner diameter of a middle part of the cylinder, and the inner diameter of the middle part of the cylinder is greater than an inner diameter of the lower part of the cylinder.

Furthermore, a first oil guide hole is penetrated through the bottom cover, a second oil guide hole in communication with the first oil guide hole is penetrated through the top cover, and a hot hydraulic oil is injected cyclically into the cylinder through the first oil guide hole and the second oil guide hole to perform heating and pressurizing on the square test block.

In conclusion, the present disclosure includes at least one of the following beneficial effects.

1. By disposing the wedge-shaped pre-press modules, an assembling gap between the liquid bladders and the inner wall of the cylinder can be eliminated such that the liquid bladders can be fully attached to and act on the square test block. Thus, it can be applied to a large-size physical model test machine while the inherent defect of failure of the rigid loading device of the conventional physical model test machine to output a uniform load can be overcome.
2. With the top cover and the bottom cover, the flexible loading mechanisms can be mounted in a sealed cylinder. When a load is applied to the square test block, it is not required to open a hole in the cylinder, ensuring the structural integrity of the cylinder and improving the bearing capability and the sealing performance of the cylinder.
3. The bottom cover, the lower shear ring, the cylinder, the top cover and the upper shear ring form a self-balanced structure, which requires no additional reaction frame, showing simple entire structure. Furthermore, based on a loading force, it is optimized and designed as a cylindrical structure, reducing reliance on large-size forged piece and significantly lowering the manufacturing costs and mounting space requirements.
4. By oil bath, the square test block can be heated. The uniformity of the oil temperature can be guaranteed by allowing the hot hydraulic oil to circulate, which prevents the square test block from suffering thermal damage during test due to excessively high local temperature gradient.
5. The square test block can withstand unequal stresses of three directions and high temperatures, satisfying the requirements of simulation for the three-high environment of the deep geotechnical engineering.

BRIEF DESCRIPTION OF THE DRAWINGS

In order to more clearly describe the technical solutions in the present disclosure and the prior arts, brief descriptions will be made on the drawings required for descriptions of the embodiments or the prior arts. Apparently, the drawings described hereunder are some embodiments of the present disclosure. Those skilled in the arts can also obtain other drawings based on these drawings without carrying out creative work.

The numerals of the drawings are described below: 1. cylinder, 2. bottom cover, 3. supporting bracket, 4. top cover, 5. lower shear ring, 6. upper shear ring, 71. first bladder, 72. lower wedge-shaped block, 73. upper wedge-shaped block, 74. press block, 75. adjusting bolt, 76. second bladder, 8. first seal, 9. second seal, 10. first oil guide hole, 11. square test block, 12. second oil guide hole, 13. first oblique surface, 14. second oblique surface, 15. padding plate, 16. screw rod, 17. lift ring, 18. curved-surface trapezoidal shear block, 19. curved-surface rectangular shear block, 20. radial bolt, 21. annular clamping groove, 22. fixing seat, 23. traction piece, 24. upper boss, 25. third seal, 251. mounting groove, 252. sealing ring, 253. press plate, 254. press screw, 26. fourth seal, 27. penetration hole, 28. sealing plug, 29. pedestal, 30. padding block, 31. thread hole, 32. notch, 33. metal gasket, 34. space-neighboring surface, 35. non-space-neighboring surface.

DESCRIPTION OF THE EMBODIMENTS

In order to make the objects, technical solutions and advantages of the present disclosure clearer, the technical solutions of the present disclosure will be clearly and fully described below in combination with the drawings in the present disclosure. Apparently, the embodiments described herein are only some embodiments of the present disclosure rather than all embodiments. All other embodiments obtained by those skilled in the arts based on the embodiments in the present disclosure without carrying out creative work shall all fall within the scope of protection of the present disclosure.

Figure 1:
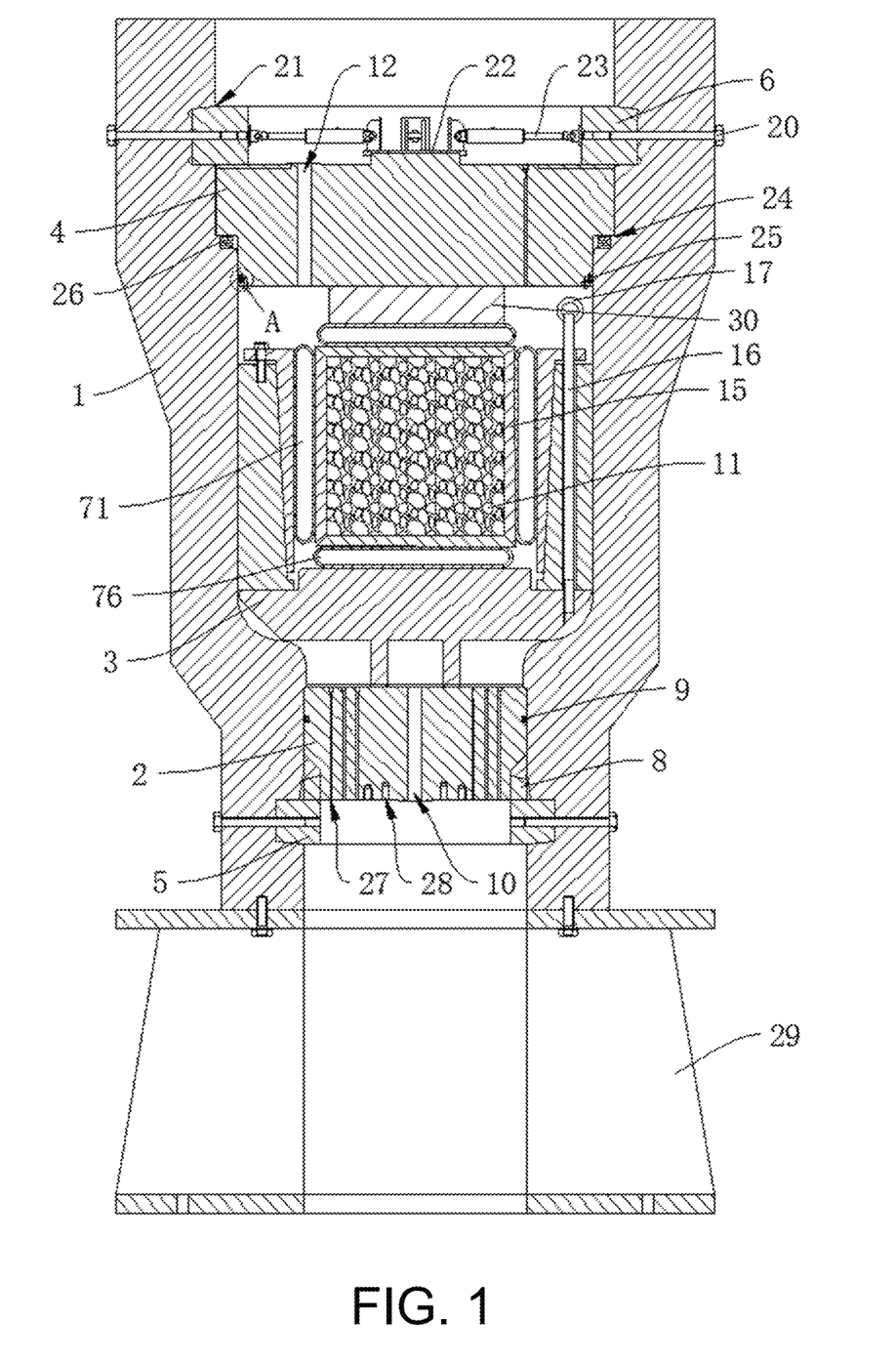
FIG. 1 is a schematic diagram of an entire sectional structure according to an embodiment of the present disclosure.

One or more embodiments of the present disclosure provide a large-space high-temperature and high-pressure true triaxial flexible loading device. As shown in FIG. 1, the large-space high-temperature and high-pressure true triaxial flexible loading device includes a cylinder reaction frame, a confining pressure reaction frame and a flexible loading mechanism. The cylinder reaction frame includes a cylinder 1, a lower shear ring 5, a bottom cover 2, a top cover 4 and an upper shear ring 6, where the lower shear ring 5, the bottom cover 2, the top cover 4 and the upper shear ring 6 are sequentially and detachably disposed from bottom up inside the cylinder 1. The lower shear ring 5 is embedded on an inner wall of the cylinder 1 below the bottom cover 2 to form a lower bearing boss supporting the bottom cover 2. The upper shear ring 6 is embedded on the inner wall of the cylinder 1 above the top cover 4 to form an upper reaction boss supporting the top cover 4. Thus, an interior of the cylinder 1 is divided to form a loading space for performing triaxial test on a square test block 11. The confining pressure reaction frame is mounted in the loading space around the square test block 11, and the flexible loading mechanisms are disposed in pairs at two opposed side surfaces of the square test block 11 to perform triaxial loading on the square test block 11. A top flexible loading mechanism is disposed between a top of the square test block 11 and the top cover 4, a bottom flexible loading mechanism is disposed between a bottom of the square test block 11 and the bottom cover 2, and surrounding flexible loading mechanisms are disposed between surroundings of the square test block 11 and the confining pressure reaction frame. The confining pressure reaction frame can uniformly transfer to an inner sidewall of the cylinder 1 a reactive force generated by the flexible loading mechanisms around the square test block 11 during a loading process.

The present disclosure changes the convention of performing axial loading by using an external hydraulic rod in the prior arts and performs axial loading and confining pressure loading by using the flexible loading mechanisms such that loading forces of three directions can be separately controlled. Further, due to large contact area between the flexible loading mechanism and the square test block 11 in the present disclosure, the loading force actually generated is far greater than the one generated by the hydraulic rod in the prior arts. Furthermore, in the present disclosure, a top reaction frame fixed by bolts in the prior arts is changed into a shear ring embedded into the inner wall of the cylinder 1 and the reactive force borne by the bolts during an axial loading process is changed into a positive pressure between the shear ring and an inner embedding groove. Since the contact area of the positive pressure between the shear ring and the inner embedding groove is far greater than a section area of the bolts distributed in scattered way, the positive pressure borne by the shear ring is far greater than a pull force borne by the bolts in a case of a same material. Therefore, in the present disclosure, the axial reactive force borne by the top cover 4 is far greater than the one in the prior arts such that the present disclosure is especially applicable to an ultra high pressure loading of a large concrete member. Furthermore, in the present disclosure, an integral cylinder is used as basic reaction frame and the extreme bearing capability is also far greater than that of the spliced reaction frame in the prior arts.

Figure 2:
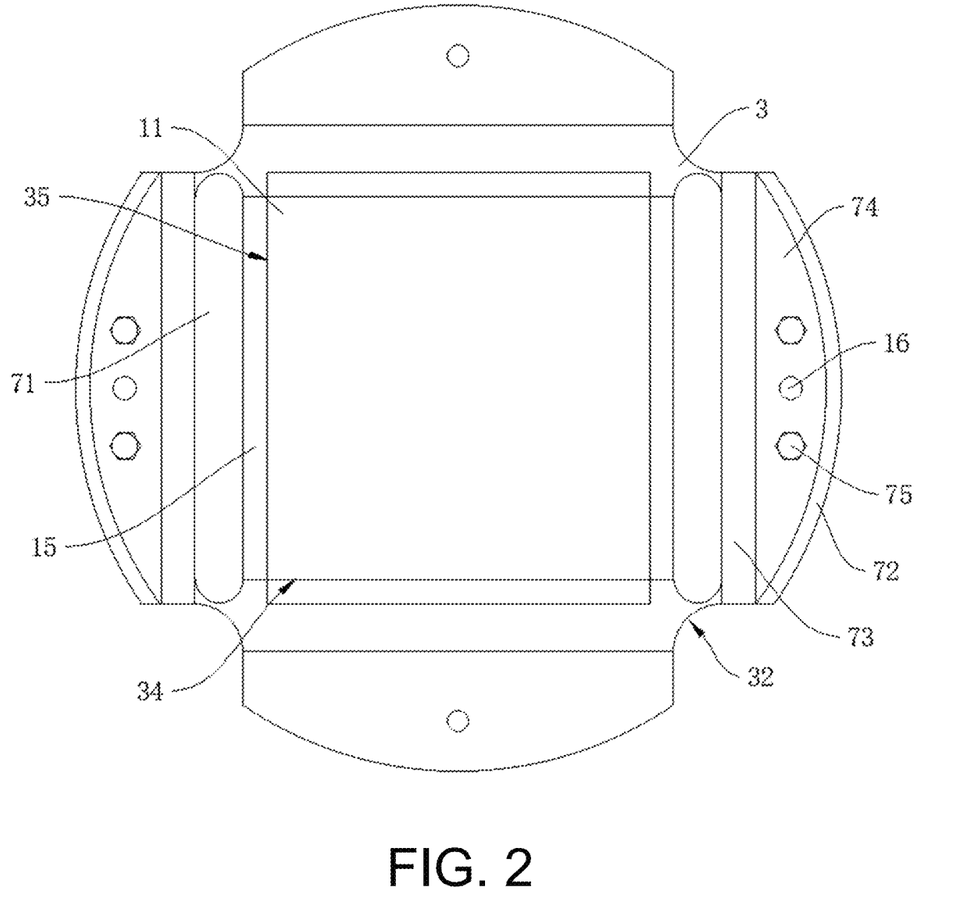
FIG. 2 is a top view of a supporting bracket, a flexible loading mechanism, a square test block, a padding plate and a screw rod according to an embodiment of the present disclosure.
Figure 3:
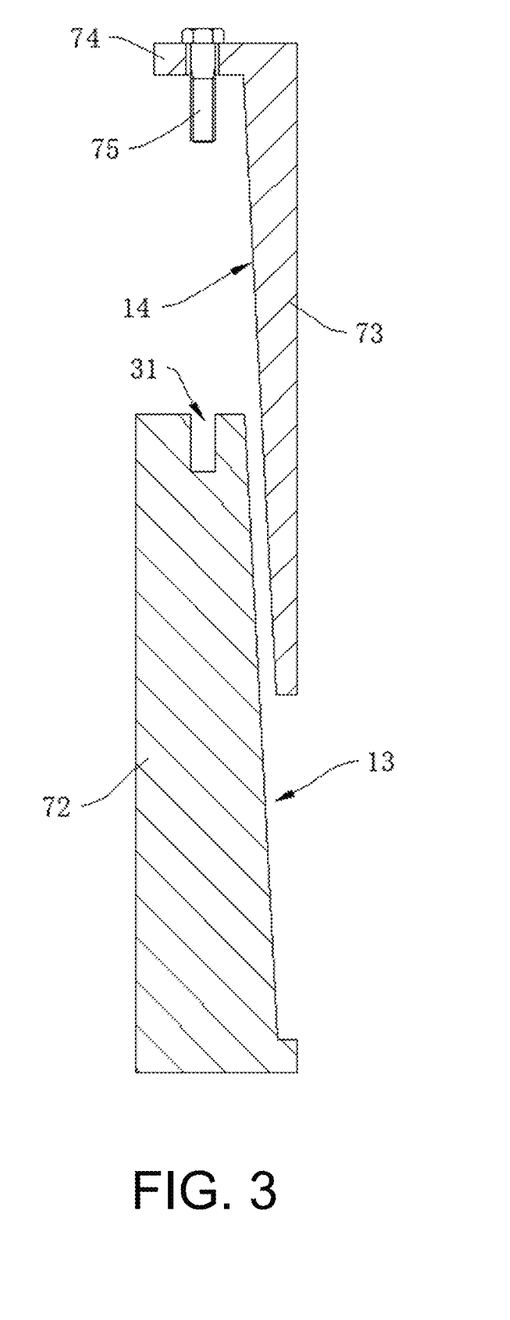
FIG. 3 is a schematic diagram of a sectional structure of a lower wedge-shaped block and an upper wedge-shaped block according to an embodiment of the present disclosure.

In order to stably place the square test block 11 in the loading space for performing triaxial test simulation, by referring to FIGS. 1, 2 and 3, a supporting bracket 3 for supporting the square test block 11 is disposed in the loading space inside the cylinder 1. The square test block 11 is stably placed on an upper surface of the supporting bracket 3. One pair of two opposed side surfaces on the square test block 11 are space-neighboring surfaces 34 whereas other pair of two opposed side surfaces are non-space-neighboring surfaces 35. The confining pressure reaction frame and the flexible loading mechanism are both mounted on the supporting bracket 3. The confining pressure reaction frame includes wedge-shaped pre-press modules disposed in pairs beyond two opposed side surfaces of the square test block 11, and the wedge-shaped pre-press modules are located between the inner wall of the cylinder 1 and the non-space-neighboring surfaces 35 of the square test block 11. Each of the wedge-shaped pre-press modules includes a lower wedge-shaped block 72, an upper wedge-shaped block 73 and an adjusting piece capable of adjusting and locking a relative position of them. The upper wedge-shaped block 73 and the lower wedge-shaped block 72 are overlapped between a side surface of the square test block 11 and the inner wall of the cylinder 1. The lower wedge-shaped block 72 is fixedly mounted on the supporting bracket 3 and an outer side surface of the lower wedge-shaped block 72 is configured as a curved surface matching the inner wall of the cylinder 1 to disperse the reactive force. A wedge-shaped surface on the lower wedge-shaped block 72 is a first oblique surface 13 and a wedge-shaped surface on the upper wedge-shaped block is a second oblique surface 14. The upper wedge-shaped block 73 and the lower wedge-shaped block 72 cooperate with each other through the wedge-shaped surfaces. An inner side surface of the upper wedge-shaped block 73 is configured as a plane matching the side surface of the square test block 11. In this way, when up and down relative movement between the upper wedge-shaped block 73 and the lower wedge-shaped block 72 occurs, a thickness can be adjusted. By adjusting a distance between the two opposed sides of the square test block 11 and the wedge-shaped pre-press modules respectively, the problem that the non-uniformity between the square test block 11 and the inner wall of the cylinder 1 results from the inaccurate centering of the square test block 11 for lifting error can be solved. Furthermore, by adjusting the thickness of the wedge-shaped pre-press modules, a gap between the wedge-shaped pre-press modules and the square test block 11 can be adjusted so as to generate a preloading force, avoiding damage to the flexible loading mechanisms due to excessive deformation during loading.

In order to accurately adjust the thickness of the wedge-shaped pre-press modules, a press block 74 is integrally formed on a top of the upper wedge-shaped block 73. The press block 74 is located above the lower wedge-shaped block 72, and the adjusting piece is disposed as adjusting bolt 75. A thread hole 31 matching threads of the adjusting bolt 75 is opened on a top of the lower wedge-shaped block 72. The adjusting bolt 75 is inserted through the press block 74 and thread-connected in the thread hole 31 on the top of the lower wedge-shaped block 72. The adjusting bolt 75 is rotated to change a depth of the adjusting bolt 75 into the thread hole 31 and thus the adjusting bolt 75 drives the upper wedge-shaped block 73 to slide on the lower wedge-shaped block 72 so as to accurately adjust and lock the thickness of the wedge-shaped pre-press module. As shown in FIGS. 1, 2 and 3, the gap is configured between the space-neighboring surfaces 34 of the square test block 11 and the inner wall of the cylinder 1 and thus a hydraulic oil is introduced thereby into the loading space to perform loading on the two space-neighboring surfaces 34 of the square test block 11. The flexible loading mechanisms around the square test block 11 are disposed between the non-space-neighboring surfaces 35 of the square test block 11 and the wedge-shaped pre-press modules. Hence, a loading force of horizontal direction can be provided by the flexible loading mechanisms. Each the flexible loading mechanisms includes a flat plate type liquid bladder which is formed by welding high-strength thin-walled steel plates, where a shape of the flat plate matches a corresponding side surface of the square test block 11. The liquid bladder is connected with an oil supply system outside the cylinder 1 through a hydraulic oil pipe and thus can be filled with a hydraulic oil. In the embodiments of the present disclosure, the liquid bladder can bear an internal pressure of up to 150 MPa. Coupled with a loading area of 0.64 $m^2$ and a loading effect of a loading piece, a loading requirement of up to 8000 t can be applied to the square test block 11.

As shown in FIGS. 1, 2 and 3, the liquid bladders between the non-space-neighboring surfaces 35 of the square test block 11 and the wedge-shaped pre-press modules are first bladders 71. When loading is to be performed on the non-space-neighboring surfaces 35 of the square test block 11 by using the first bladders 71, the first bladders 71 are enabled to apply a pressure to the non-space-neighboring surfaces 35 of the square test block 11 by adjusting the thickness of the wedge-shaped pre-press modules at both sides of the square test block 11. At this time, the first bladders 71 are fully attached to and act on the side surfaces of the square test block 11, generating a pre-press force.

Further, the pre-press force of the wedge-shaped pre-press modules at both sides of the square test block 11 can reduce a deformation amount of the first bladders 71 during loading, protecting the safety of the first bladders 71.

By referring to FIG. 1, the liquid bladders located on the top and bottom of the square test block 11 are second bladders 76. The second bladder 76 on the bottom of the square test block 11 is placed on the supporting bracket 3 to apply a pressure to a bottom surface of the square test block 11, and the second bladder 76 on the top of the square test block 11 is placed on an upper surface of the square test block 11. In order to adapt to the square test blocks 11 of different sizes, a detachable padding block 30 may be further fixedly mounted at a bottom of the top cover 4. The padding block 30 of a different thickness may be used to adapt to the square test block 11 of a different size. The padding block 30 with a proper thickness can be selected based on the loading requirement for the square test block 11 and thus the second bladders 76 can apply corresponding loads to the top and bottom of the square test block 11.

When a load is applied to the top and bottom of the square test block 11, it is required to ensure the upper reaction boss which supports the top cover 4 and is formed by the upper shear ring 6 and the lower bearing boss which supports the bottom cover 2 and is formed by the lower shear ring 5 both can stably bear the reactive force generated by the second bladders 76 during loading process. Thus, with reference to FIG. 1, two annular clamping grooves 21 are opened on the inner wall of the cylinder 1, and the upper shear ring 6 and the lower shear ring 5 are in one-to-one correspondence with the two annular clamping grooves 21. The upper shear ring 6 and the lower shear ring 5 are respectively embedded into the corresponding annular clamping grooves 21. When axial loading is performed on the square test block 11, the top cover 4 and the bottom cover 2 each can bear a large axial reactive force.

Figure 4:
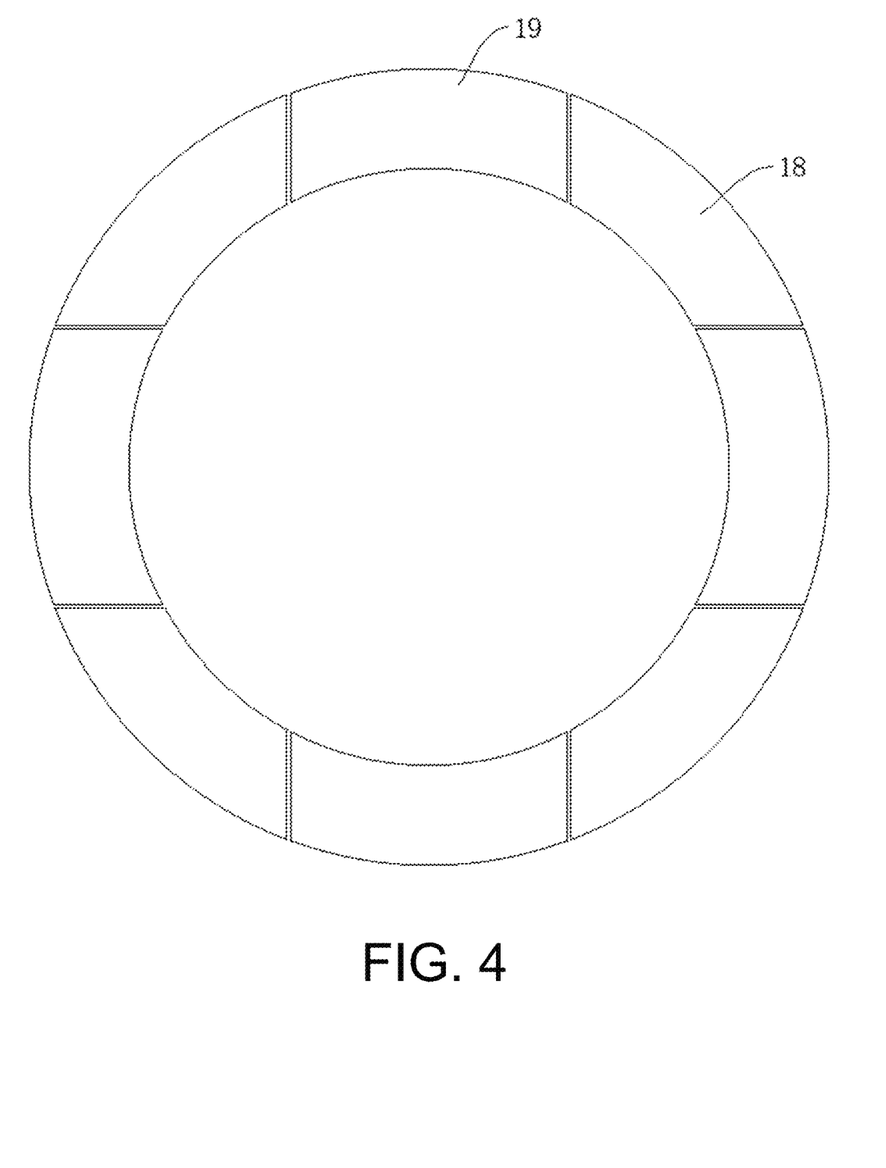
FIG. 4 is a structural schematic diagram of a curved-surface trapezoidal shear block and a curved-surface rectangular shear block according to an embodiment of the present disclosure.
Figure 5:
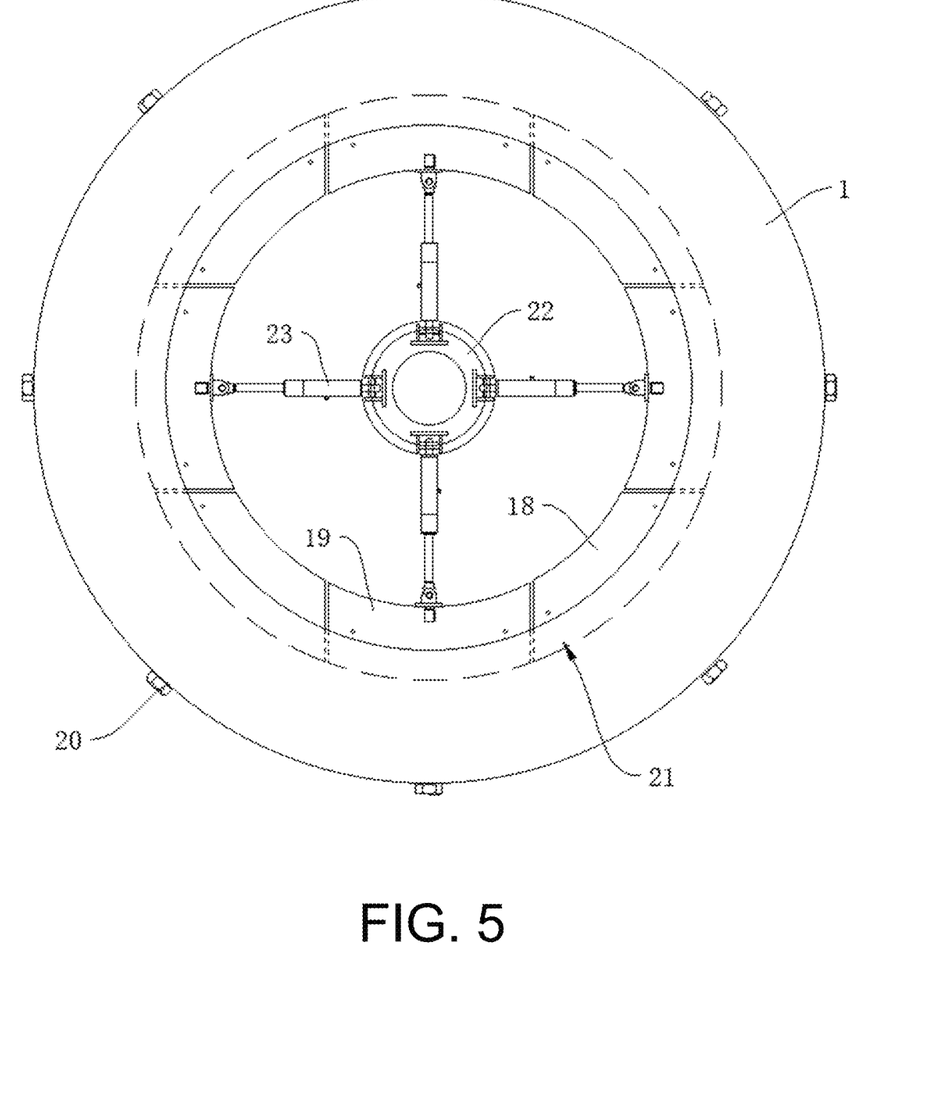
FIG. 5 is a top view of a cylinder, the curved-surface trapezoidal shear block, the curved-surface rectangular shear block, a radial bolt, a fixing seat and a traction piece according to an embodiment of the present disclosure.

Considering the triaxial loading device needs to perform loading on different square test blocks 11, the top cover 4 and the bottom cover 2 are detachably mounted inside the cylinder 1. With reference to FIGS. 1, 4 and 5, the upper shear ring 6 and the lower shear ring 5 have a same structure and both of them are each formed into a complete shear ring by splicing multiple curved-surface shear blocks, and each of the curved-surface shear blocks is fixed into the corresponding annular clamping groove 21 by a radial fixing piece. The radial fixing piece may be disposed as a radial bolt 20 which is thread-inserted through a sidewall of the cylinder 1 and then thread-connected with a peripheral wall of the corresponding curved-surface shear block, so as to stably lock the corresponding curved-surface shear block in the corresponding annular clamping groove 21. For each shear ring, the curved-surface shear blocks include curved-surface trapezoidal shear blocks 18 and curved-surface rectangular shear blocks 19 which are alternately disposed in a spacing and hence the shear ring can be spliced by radial movement. When the top cover 4 and the bottom cover 2 are to be removed from the cylinder 1, it is only required to remove the radial bolts 20 from the cylinder 1 and then move the curved-surface rectangular shear blocks 19 inwardly in a radial direction to remove the curved-surface rectangular shear blocks 19 and then easily remove the curved-surface trapezoidal shear blocks 18, so as to remove the entire shear ring from the corresponding annular clamping groove 21. In this way, the top cover 4 and the bottom cover 2 can be quickly removed from the cylinder 1.

With reference to FIGS. 1 and 5, an annular fixing seat 22 is mounted at a center of the top cover 4, multiple traction pieces 23 are mounted on the fixing seat 22, and output ends of the multiple traction pieces 23 are respectively connected one to one to central positions of inner walls of the multiple curved-surface rectangular shear blocks 19 of the upper shear ring 6. The traction piece 23 may be an electric push rod or air cylinder, and can help pull the corresponding curved-surface rectangular shear block 19 out of two adjacent curved-surface trapezoidal shear blocks 18, preventing the shear ring from being clamped in the corresponding annular clamping groove 21 due to the reactive force borne by the shear ring during a triaxial loading process.

Considering the force received at different positions of the inner wall of the cylinder 1 as well as lightweight design for cost reduction, the inner walls of an upper part and a lower part of the cylinder 1 need to bear both a radial force and an axial force whereas a middle part of the cylinder 1 only needs to bear a reactive force generated by the square test block 11 during a loading process. Therefore, as shown in FIG. 1, a wall thickness of the cylinder 1 is large in the upper and lower parts but small in the middle part. In order to divert an axial acting force between the bottom cover 2 and the inner wall of the cylinder 1, an inner diameter of the middle part of the cylinder 1 is greater than an inner diameter of the lower part of the cylinder 1 such that a lower boss is formed at the connection position of the inner wall of the middle part and the inner wall of the lower part of the cylinder 1. The supporting bracket 3 includes a tray covered on the lower boss and a bottom frame integrally formed at a bottom of the tray. The bottom frame is in contact with an upper surface of the bottom cover 2, and the square test block 11, the confining pressure reaction frame and the flexible loading mechanism are all located on the tray. The lower boss supports the tray and thus, to some degree, reduces a compressive stress of the bottom frame on the bottom cover 2 and further reduces the axial acting force between the bottom cover 2 and the inner wall of the cylinder 1. In order to place the supporting bracket 3 and the square test block 11 quickly into the loading space in the cylinder 1, an inner diameter of the upper part of the cylinder 1 is greater than the inner diameter of the middle part of the cylinder 1.

For the purpose of quickly placing the supporting bracket 3 carrying the square test block 11 into the loading space in the cylinder 1, as shown in FIGS. 1 and 2, screw rods 16 are mounted around the supporting bracket 3. The screw rod 16 located at the two non-space-neighboring surfaces 35 of the square test block 11 sequentially penetrates through the tray, the lower wedge-shaped block 72 and the press block 74 and extends to above the press block 74, whereas the screw rod 16 at the two space-neighboring surfaces 34 of the square test block 11 only penetrates through the tray. A lift ring 17 is disposed on a top of the screw rods 16. The to-be-tested square test block 11 is placed on the supporting bracket 3 and then the lift rings 17 are connected to a lift device. With the lift rings 17 and the screw rods 16, the supporting bracket 3 carrying the to-be-tested square test block 11 is stably lifted into the cylinder 1 and stably placed on the bottom cover 2 of the cylinder 1.

Figure 8:
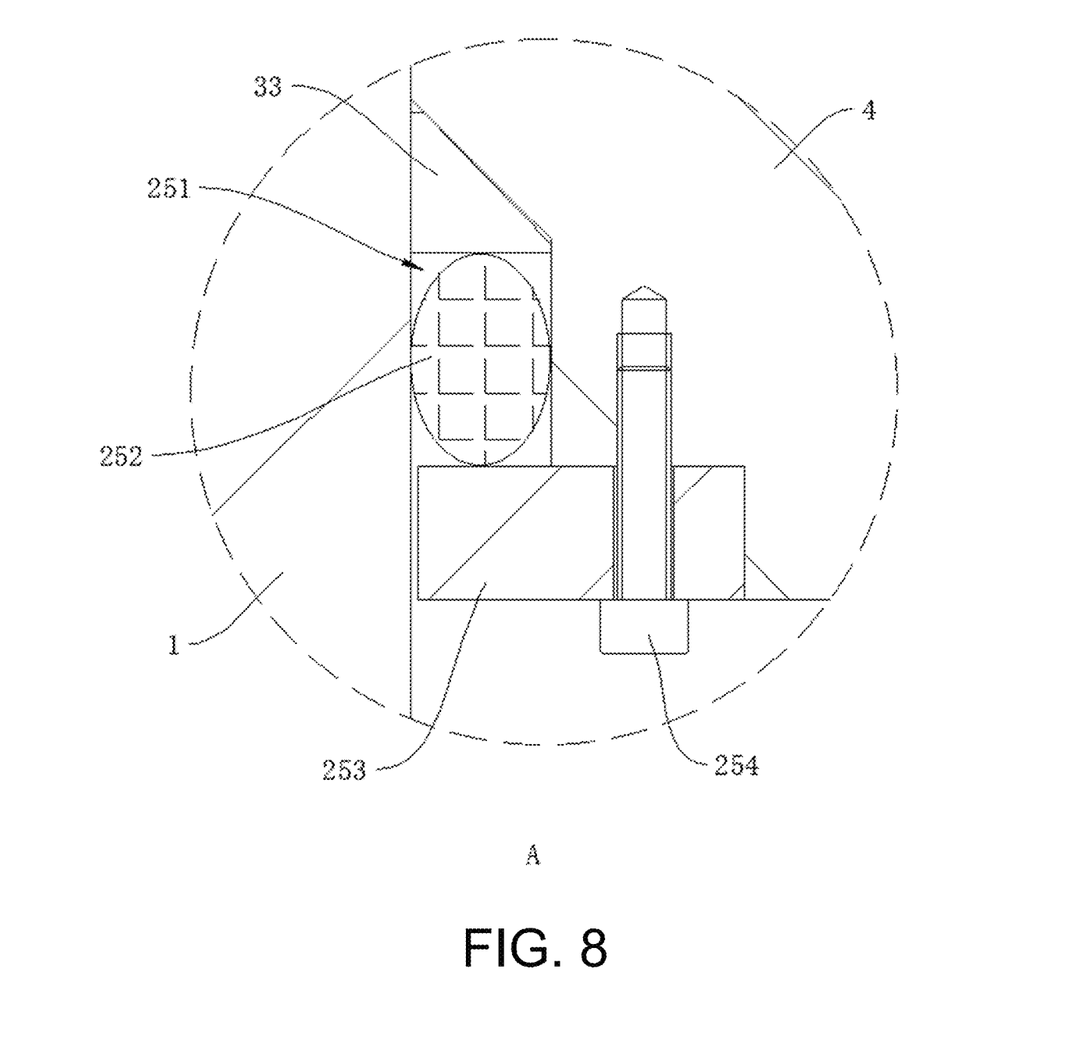
FIG. 8 is an enlarged view of the part A in FIG. 1.

Since the inner diameter of the cylinder 1 is not consistent, in order to ensure the top cover 4 and the bottom cover 2 both can be sealingly mounted in the cylinder 1, as shown in FIGS. 1 and 8, an upper boss 24 is formed at the connection position of the inner wall of the upper part and the inner wall of the middle part of the cylinder 1, and the top cover 4 is covered on the upper boss 24. The upper part of the top cover 4 is located inside an upper chamber of the cylinder 1 and a lower part of the top cover 4 is located inside the loading space of the cylinder 1. A third seal 25 is disposed between the bottom of the top cover 4 and the inner wall of the cylinder 1. A stepped mounting groove 251 for placing the third seal 25 is opened on a sidewall of the bottom of the top cover 4, and extends annularly along the top cover 4. The third seal 25 includes a metal gasket 33 sleeved on the top cover 4, a sealing ring 252 sleeved on the top cover 4, an annular press plate 253 sleeved on the top cover 4 and a press screw 254 for fixing the press plate 253 at the bottom of the top cover 4. The metal gasket 33 is located above the sealing ring 252 and the press plate 253 is located below the sealing ring 252, such that the metal gasket 33 and the press plate 253 can squeeze the sealing ring 252. When the top cover 4 is covered on the upper boss 24, the squeezed sealing ring 252 can achieve filling sealing on a gap between the sidewall of the top cover 4 and the inner wall of the cylinder 1. A fourth seal 26 is disposed between the top cover 4 and the upper boss 24. The fourth seal 26 is disposed as C-shaped rubber ring adhered to the top cover 4. When the top cover 4 is covered on the upper boss 24, the C-shaped rubber ring is squeezed to achieve sealing on a gap between the top cover 4 and the upper boss 24.

As shown in FIG. 1, a first seal 8 is disposed between a bottom of the bottom cover 2 and the inner wall of the cylinder 1. The first seal 8 includes a plastic sealing ring and a press ring, where the plastic sealing ring is above the press ring. Squeezed by the press ring, the plastic sealing ring can achieve sealing on a gap between the bottom cover 2 placed in the cylinder 1 and the inner wall of the cylinder 1. A second seal 9 is further disposed between the cylinder 1 and the bottom cover 2. The second seal 9 is disposed as O-shaped rubber ring sleeved near a middle part of the bottom cover 2. A sealed environment is formed by squeezing a sidewall of the bottom cover 2 to the inner wall of the cylinder 1. A lower sealing structure of the cylinder 1 is formed by the bottom cover 2, the first seal 8, the second seal 9 and the lower shear ring 5.

The cooperative use of the first seal 8 and the second seal 9 on the bottom cover 2 solves the sealing problem of a high-temperature ultra-high-pressure fluid, and the cooperative use of the third seal 25 and the fourth seal 26 solves the sealing problem of the high-temperature ultra-high-pressure fluid, with an eye on the requirements of frequent mounting and dismounting of the top cover 4.

Figure 6:
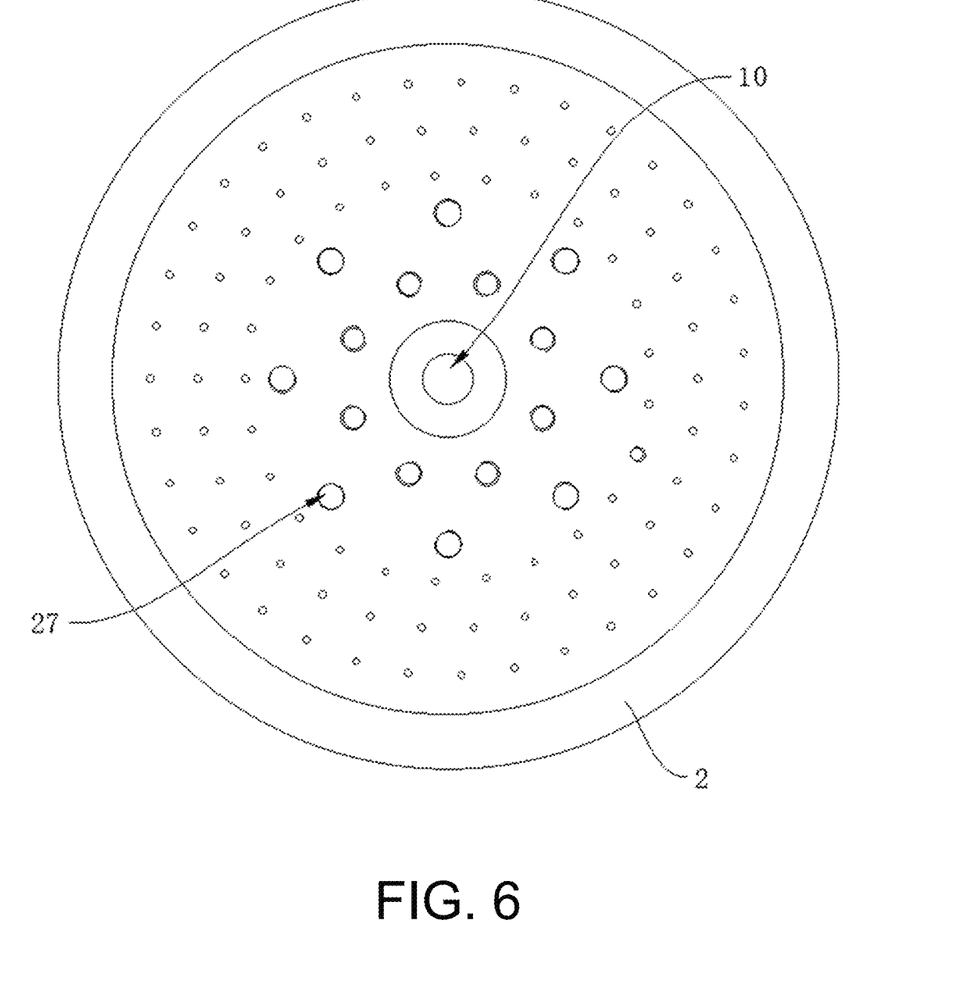
FIG. 6 is a structural schematic diagram of a bottom cover according to an embodiment of the present disclosure.
Figure 7:
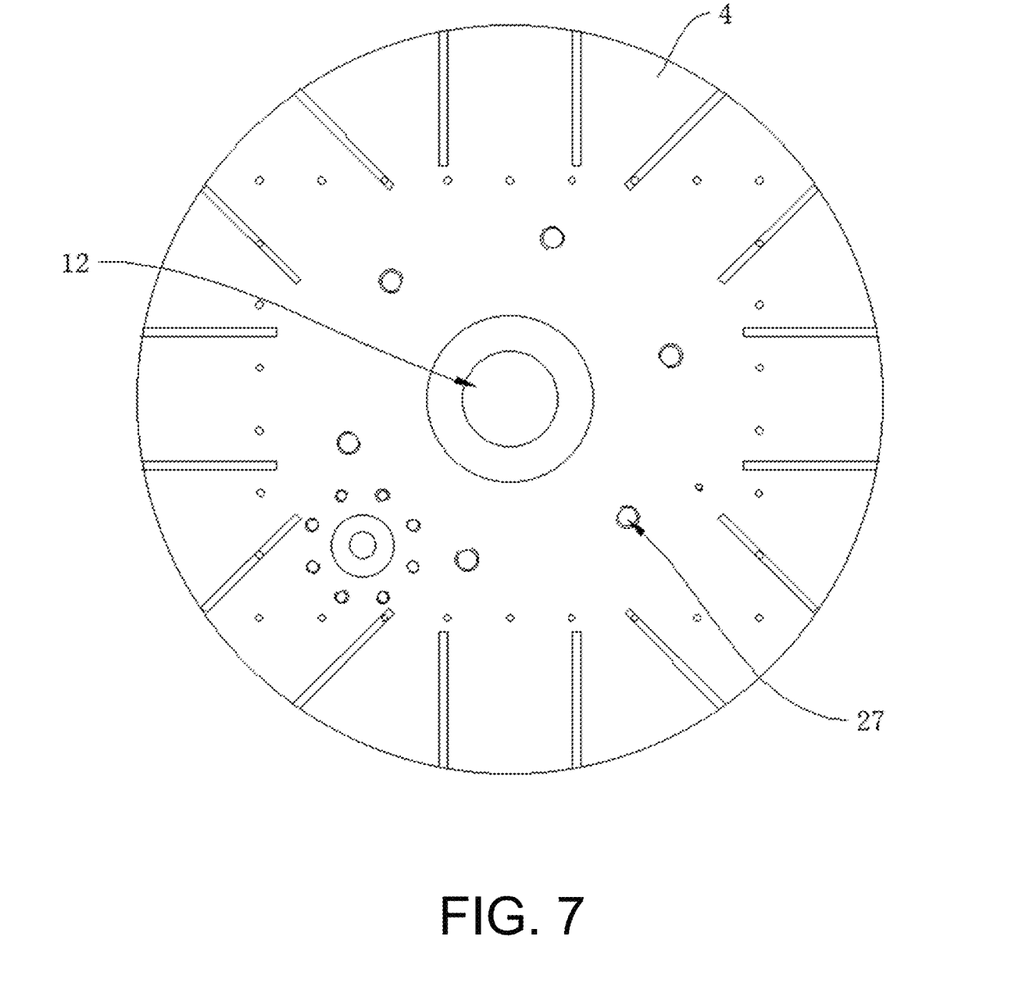
FIG. 7 is a structural schematic diagram of a top cover according to an embodiment of the present disclosure.

In order to simulate the law of the disturbance behaviors of the square test block 11 at high temperature, it is required to heat the square test block 11 at high temperature. Since heat can only be transferred between solids for the full frame structure in the prior arts, heat transfer is slow in the square test block 11 and the temperature gradient in each part of the square test block 11 is large. Therefore, in the embodiments of the present disclosure, the square test block 11 is heated by oil bath. As shown in FIGS. 1, 6 and 7, a first oil guide hole 10 is penetrated in the bottom cover 2, and a second oil guide hole 12 in communication with the first oil guide hole 10 is penetrated in the top cover 4. The first oil guide hole 10 and the second oil guide hole 12 both are connected with an extraction and injection pump via a pipe, and a circulating hydraulic oil is injected into the cylinder 1 by the extraction and injection pump, and thus the square test block 11 is fully soaked in the hydraulic oil. A heater and a temperature sensor are mounted in the cylinder 1. The hydraulic oil in the cylinder 1 can be heated and at the same time, confining pressure loading can be performed on the two space-neighboring surfaces 34 of the square test block 11 by using a pressure of the hydraulic oil. Thus, a temperature-controlled liquid high-temperature environment with uniform temperature distribution can be formed in the cylinder 1, which helps study the law of the disturbance behaviors of the square test block 11 at different temperatures. In order to conveniently connect with the extraction and injection pump, the cylinder 1 is to be suspended such that the first oil guide hole 10 on the bottom cover 2 is suspended. For this purpose, a pedestal 29 is mounted at a bottom of the cylinder 1. The cylinder 1 is mounted on the pedestal 29 by screws, and a mounting through hole in communication with the first oil guide hole 10 is penetrated in a center of the pedestal 29.

In order to enable the hydraulic oil to smoothly reach the square test block 11 above the supporting bracket 3 from the pedestal, as shown in FIGS. 1 and 2, the tray is entirely disposed as disk shape in insertion fit with the cylinder 1, and a notch 32 for the hydraulic oil to run through is opened at an edge of the tray between two adjacent lower wedge-shaped blocks 72. When the supporting bracket 3 is placed in the cylinder 1, the hydraulic oil below the supporting bracket 3 can enter a space above the supporting bracket 3 through the notches 32 and smoothly heat the square test block 11 on the supporting bracket 3.

When the square test block 11 is soaked in the hydraulic oil, in order to prevent the substances in the hydraulic oil from reacting with the substances in the square test block 11 and affecting the strength of the square test block 11, as shown in FIGS. 1 and 2, each side surface of the square test block 11 is sealingly bonded with a padding plate 15 by a sealing adhesive. Thus, six padding plates 15 are sealingly wrapped around the square test block 11 to prevent the hydraulic oil from entering the square test block 11, and hence prevent the substances in the hydraulic oil from reacting with the substances in the square test block 11, and hence affecting the strength of the square test block 11.

Furthermore, in order to satisfy the requirements of the test for various substances and information interaction such as entry and exit of pore fluid, fracturing liquid and the like, entry and exit of the hydraulic oil, output of signals such as sound, light, electric and deformation signals and the like and input of control signals, as shown in FIGS. 1, 6 and 7, penetration holes 27 of various sizes are opened in an annular distribution on the bottom cover 2, with corresponding sealing plugs 28, and penetration holes 27 of various sizes are also opened in an annular distribution on the top cover 4, with corresponding sealing plugs 28. Thus, various pipelines can be allowed to enter or exit as a supplementation to the functions of the bottom cover 2.

In the embodiments of the present disclosure, the implementation principle of the large-space high-temperature and high-pressure true triaxial flexible loading device is as follows: firstly, multiple curved-surface trapezoidal shear blocks 18 and multiple curved-surface rectangular shear blocks 19 are inserted alternately into the annular clamping groove 21 at the lower part of the cylinder 1, and then fixed by multiple radial bolts 20 to form the lower shear ring 5; next, the bottom cover 2 is mounted on the lower shear ring 5 to enable the bottom cover 2, the first seal 8, the second seal 9 and the lower shear ring 5 to form the lower sealing structure of the cylinder 1; next, the second bladder 76 is placed on the supporting bracket 3 and then the square test block 11 with the padding plates 15 is lifted onto the second bladder 76; next, one pair of wedge-shaped pre-press modules are mounted on the supporting bracket 3 and two first bladders 71 are respectively placed at the two non-space-neighboring surfaces 35 of the square test block 11 and then the adjusting bolts 75 of the two wedge-shaped pre-press modules are rotated respectively to push the upper wedge-shaped blocks 73 to move toward the corresponding lower wedge-shaped blocks 72; at this time, the upper wedge-shaped blocks 73 can push the corresponding first bladders 71 to fill the gap generated at a side of the square test block 11 due to eccentricity so as to perform pre-loading; the adjusting bolts 75 are further rotated until the square test block 11 is tightly clamped by the first bladders 71 at two opposed sides; at this time, the forces received by the square test block 11 along a distribution direction of the two first bladders 71 are balanced. By controlling the depth of the adjusting bolts 75 into the thread holes 31, the squeeze forces of the upper wedge-shaped blocks 73 on the first bladders 71 can be adjusted so that the squeeze forces received by the first bladders 71 can be transferred to the corresponding padding plates 15 as possible, and then can fully act on the square test block 11 through the padding plates 15, completing the pre-loading.

Next, by using the lift device connected with the lift rings 17 and the screw rods 16, the supporting bracket 3 carrying the to-be-tested square test block 11 is lifted stably into the cylinder 1, and then stably placed on the bottom cover 2 of the cylinder 1. Then, the other second bladder 76 is placed on the square test block 11, and the padding block 30 with a proper thickness is selected and mounted at the bottom of the top cover 4 and then the top cover 4 with the third seal 25 and the fourth seal 26 is sealingly covered on the boss of the cylinder 1. At this time, by selecting the thickness of the padding block 30, the upper surface of the square test block 11 is made to be just in contact with the second bladder 76. Next, the upper shear ring 6 is mounted. In order to ensure the upper shear ring 6 is smoothly mounted, multiple curved-surface trapezoidal shear blocks 18 are firstly inserted in a spacing into the annular clamping groove 21 at the upper part of the cylinder 1 and the traction pieces 23 are started to help push the curved-surface rectangular shear blocks 19 to move into the annular clamping groove 21 and insert them between two adjacent curved-surface trapezoidal shear blocks 18. In this case, multiple curved-surface trapezoidal shear blocks 18 and multiple curved-surface rectangular shear blocks 19 are enclosed to form the upper shear ring 6. Further, by using multiple radial bolts 20, multiple curved-surface trapezoidal shear blocks 18 and multiple curved-surface rectangular shear blocks 19 in the upper shear ring 6 are all fixedly locked to the cylinder 1. At this time, the upper shear ring 6 can stably press the top cover 4 such that the padding block 30 always stably acts on the second bladder 76. The bottom cover 2, the lower shear ring 5, the cylinder 1, the top cover 4 and the upper shear ring 6 are formed into a self-balanced structure. Each of the hydrostatic internal pressure and deviatoric stress received by the structure is a symmetrical load and can be counteracted by self. Therefore, no external frame is needed to provide a reactive force and no additional load is generated except for the deadweight.

Finally, pipelines required for test measurement are inserted into the multiple penetration holes 27 in the top cover 4 and the bottom cover 2, and the first oil guide hole 10 and the second oil guide hole 12 are both connected with an extraction and injection pump via a pipe. The heater and the temperature sensor in the cylinder 1 are started. As the extraction and injection pump injects a hydraulic oil cyclically into the cylinder 1, the heater heats the hydraulic oil such that a temperature-controlled liquid high-temperature environment with uniform temperature distribution can be formed in the cylinder 1 to heat the square test block 11, so as to study the law of the disturbance behaviors of the square test block 11 at different temperatures. Furthermore, a different volume of hydraulic oil can be injected into the cylinder 1 by the extraction and injection pump such that the high-pressure hydraulic oil can perform loading on the two space-neighboring surfaces 34 of the square test block 11, so as to simulate a triaxial loading test on the square test block 11.

Finally, it should be noted that the above embodiments are used only to illustrate the technical solutions of the present disclosure rather than to limit the present disclosure. Although the present disclosure has been detailed by referring to the preceding embodiments, those skilled in the arts should understand that modifications can be still made to the technical solutions recorded in the above embodiments or equivalent replacement can be made to partial technical features therein. All these modifications or replacements do not cause the essence of the corresponding technical solutions to depart from the spirit and scope of the technical solutions of the embodiments of the present disclosure.

What is claimed is:

1. A large-space high-temperature and high-pressure true triaxial flexible loading device, comprising:

a cylinder reaction frame, comprising a cylinder, a lower shear ring, an upper shear ring, a bottom cover, and a top cover, wherein the bottom cover and the top cover are detachably mounted at a bottom and a top inside the cylinder respectively, and an interior of the cylinder is divided to form a loading space for performing a triaxial test on a square test block; the lower shear ring is detachably embedded on an inner wall of the cylinder below the bottom cover to form a lower bearing boss for supporting the bottom cover; the upper shear ring is detachably embedded on the inner wall of the cylinder above the top cover to form an upper reaction boss for supporting the top cover;

a confining pressure reaction frame, mounted in the loading space around the square test block, the confining pressure reaction frame comprises wedge-shaped pre-press modules disposed in pairs beyond two opposed side surfaces of the square test block, each the wedge-shaped pre-press modules comprises a lower wedge-shaped block, an upper wedge-shaped block and an adjusting piece capable of adjusting and locking a relative position of the lower wedge-shaped block and the upper wedge-shaped block, the upper wedge-shaped block and the lower wedge-shaped block are overlapped between a side surface of the square test block and the inner wall of the cylinder, an outer side surface of the lower wedge-shaped block is configured as a curved surface matching the inner wall of the cylinder to disperse a reactive force, an inner side surface of the upper wedge-shaped block is configured as a plane matching the side surface of the square test block, and the upper wedge-shaped block and the lower wedge-shaped block cooperate by wedge-shaped surfaces such that when up and down relative movement between the upper wedge-shaped block and the lower wedge-shaped block occurs, a thickness is adjusted;

flexible loading mechanisms, disposed in pairs at the two opposed side surfaces of the square test block to perform triaxial loading on the square test block, wherein a top flexible loading mechanism is disposed between a top of the square test block and the top cover, a bottom flexible loading mechanism is disposed between a bottom of the square test block and the bottom cover, and surrounding flexible loading mechanisms are disposed between surroundings of the square test block and the confining pressure reaction frame, and the confining pressure reaction frame is used for uniformly transfer to an inner sidewall of the cylinder a reaction force generated by the flexible loading mechanisms during loading process;

an inner diameter of an upper part of the cylinder is greater than an inner diameter of a middle part of the cylinder, and the inner diameter of the middle part of the cylinder is greater than an inner diameter of a lower part of the cylinder such that an upper boss is formed at a connection position of the inner wall of the upper part and the inner wall of the middle part of the cylinder, a lower boss is formed at the connection position of the inner wall of the middle part and the inner wall of the lower part of the cylinder;

a first seal is disposed between a bottom of the bottom cover and the inner wall of the cylinder, a second seal is further disposed between the cylinder and the bottom cover, the second seal is disposed as O-shaped rubber ring sleeved near a middle part of the bottom cover, a sealed environment is formed by squeezing a sidewall of the bottom cover to the inner wall of the cylinder;

the top cover is covered on the upper boss, the upper part of the top cover is located inside an upper chamber of the cylinder and a lower part of the top cover is located inside the loading space of the cylinder, a third seal is disposed between a bottom of the top cover and the inner wall of the cylinder, the third seal includes a metal gasket sleeved on the top cover, a sealing ring sleeved on the top cover, an annular press plate sleeved on the top cover and a press screw for fixing the press plate at the bottom of the top cover, the metal gasket is located above the sealing ring and the press plate is located below the sealing ring, such that the metal gasket and the press plate can squeeze the sealing ring, when the top cover is covered on the upper boss, the squeezed sealing ring can achieve filling sealing on a gap between a sidewall of the top cover and the inner wall of the cylinder, a fourth seal is disposed between the top cover and the upper boss, the fourth seal is disposed as C-shaped rubber ring adhered to the top cover, when the top cover is covered on the upper boss, the C-shaped rubber ring is squeezed to achieve sealing on a gap between the top cover and the upper boss;

a supporting bracket for supporting the square test block is disposed in the loading space inside the cylinder, the supporting bracket disposed on the lower boss; and a first oil guide hole is penetrated through the bottom cover, a second oil guide hole in communication with the first oil guide hole is penetrated through the top cover, and a hot hydraulic oil is injected cyclically into the cylinder through the first oil guide hole and the second oil guide hole to perform heating and pressurizing on the square test block.

2. The large-space high-temperature and high-pressure true triaxial flexible loading device of claim 1, wherein one pair of opposed side surfaces on the square test block are space-neighboring surfaces, other pair of opposed side surfaces are non-space-neighboring surfaces, the surrounding flexible loading mechanisms are disposed between the non-space-neighboring surfaces and the wedge-shaped pre-press modules, and a gap is configured between the space-neighboring surfaces and the inner wall of the cylinder to introduce a hydraulic oil into the loading space for loading.

3. The large-space high-temperature and high-pressure true triaxial flexible loading device of claim 1, wherein each the flexible loading mechanisms comprises a flat plate type liquid bladder which is formed by welding high-strength thin-walled steel plates, a shape of the flat plate type liquid bladder matches a corresponding side surface of the square test block, and the flat plate type liquid bladder is connected with an oil supply system outside the cylinder through a hydraulic oil pipe.

4. The large-space high-temperature and high-pressure true triaxial flexible loading device of claim 2, wherein each side surface of the square test block is fixed with a padding plate by a sealing adhesive.

5. The large-space high-temperature and high-pressure true triaxial flexible loading device of claim 1, wherein the upper shear ring and the lower shear ring have a same structure and are each formed into a complete shear ring by splicing multiple curved-surface shear blocks, annular clamping grooves is disposed at a corresponding position of the inner wall of the upper part and the lower part of the cylinder, and each the curved-surface shear block is fixed inside the annular clamping groove by a radial fixing piece.

6. The large-space high-temperature and high-pressure true triaxial flexible loading device of claim 5, wherein, for each the upper shear ring and the lower shear ring, the curved-surface shear blocks comprise curved-surface trapezoidal shear blocks and curved-surface rectangular shear blocks which are alternately disposed in a spacing and hence the shear ring is spliced by radial movement.

7. The large-space high-temperature and high-pressure true triaxial flexible loading device of claim 6, wherein a fixing seat is mounted at a center of the top cover, and multiple traction pieces connected with the curved-surface rectangular shear blocks are mounted on the fixing seat, so as to achieve radial movement of the curved-surface rectangular shear blocks under the action of the traction pieces.

\* \* \* \* \*